April 21, 1964 A. J. PAUL, JR 3,130,399

INFORMATION HANDLING APPARATUS

Filed Dec. 26, 1958 3 Sheets-Sheet 1

BRUSH LOGIC IN READING BINARY OUTPUT 1010

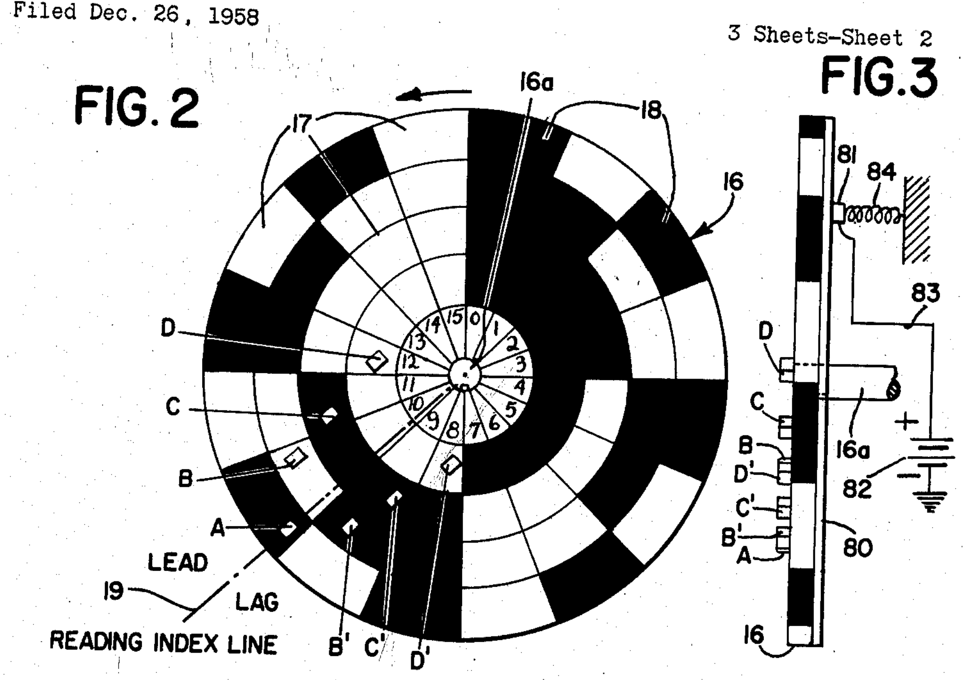
FIG. 2, FIG. 3
FIG. 4
| SECTOR NUMBER | BINARY NUMBER |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |
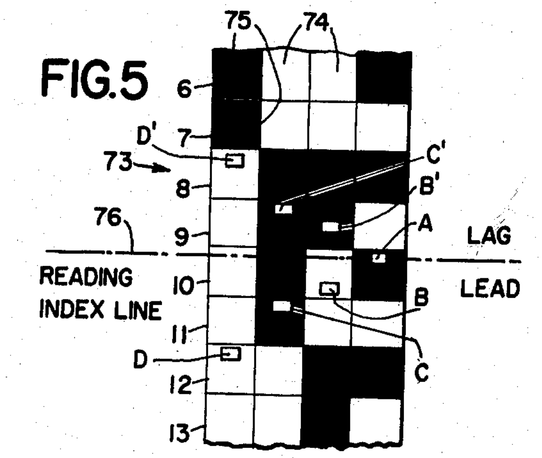
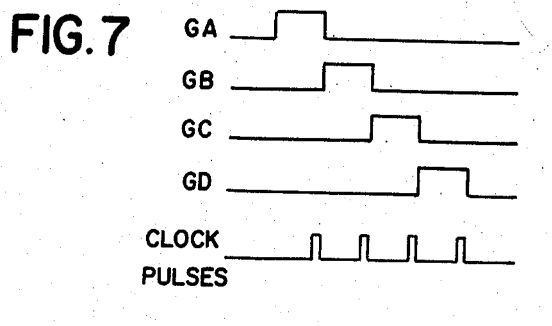

United States Patent Office 3,130,399
Patented Apr. 21, 1964

3,130,399
INFORMATION HANDLING APPARATUS

Archie J. Paul, Jr., Wappingers Falls, N.Y., assignor to International Business Machines Corporation, New York, N.Y., a corporation of New York Filed Dec. 26, 1958, Ser. No. 783,019
14 Claims. (Cl. 340—347)

This invention relates to information-handling apparatus and more particularly to such apparatus of the type wherein a particular form of intelligence is translated or otherwise converted to another form of intelligence. Certain forms of the invention relate particularly to systems for converting analog information to digital information, and to circuits useful in such systems.

In information-handling apparatus of the above type, it is frequently necessary or desirable to translate information representative of a continuously variable quantity into information which is digital or numerical in nature. Thus, for example, the continuously variable quantity may be represented by continuously variable electrical signals or mechanical displacements analogous to the quantity involved, and in some cases the desired digital representation may be binary in form.

In accomplishing such analog to digital conversion, the continuously variable or analog quantity may be subdivided into increments, and conversion may be accomplished by determining the number and/or nature of the increments contained in the particular quantity. Thus, examples of devices currently in use for this purpose include commutator and brush arrangements, wherein the commutator is divided into a plurality of segments representative of the selected increments; patterns which control the transmission or reflection of optical energy; and magnetic devices, such as a magnetic drum.

Heretofore, particularly in the case where an output in the form of a series of binary pulses is desired, difficulties have been encountered in reading such conversion devices. Additionally, the degree of accuracy obtainable in these prior devices has proved deficient in several respects. Furthermore, and this has been of special moment in devices employing coded commutators and brushes therefor, ambiguities developed with the result that a digital number other than that representative of the increment being measured frequently appeared at the output of the device.

One general object of this invention, therefore, is to provide an improved information-handling apparatus of the type wherein one form of intelligence is translated or otherwise converted to another form of intelligence.

More specifically, it is an object of this invention to provide such an apparatus in which the output appears in digital form and constitutes an accurate representation of the particular intelligence.

Another object of this invention is to provide such an apparatus wherein the possibility of signal ambiguity is substantially eliminated.

Still another object of the invention is to provide a new and improved information-handling apparatus utilizing comparatively simple electrical components which is economical to manufacture and thoroughly reliable in operation.

In one illustrative embodiment of this invention, there is provided a system for converting a mechanical displacement into electrical signals representative of a binary code and for reading the coded signals in serial form. The information from the mechanical displacement is first converted into a first and second group of coded signals. A signal that is common to each group is representative of the least significant digit in the code. The next least significant digit in the code is represented either by a signal in the first group or by a signal in the second group, and succeeding significant digits are similarly representated by a signal either in one group or the other. Each of the coded signals is supplied to a transmission circuit including an enabling device. Means is provided for serially applying an enabling signal first to the transmission circuit containing the signal representative of the least significant digit in the code, then to a pair of transmission circuits, one in each signal group, including the transmission circuit containing the desired next least significant digit in the code, and then, in a similar manner, to successive pairs of transmission circuits containing signals representative of succeeding coded digits. In order to select, for each successive coded digit, the particular group of coded signals having the signal representative of the desired digit, the system includes a bistable device operable in one state to enable the transmission circuits for one group of signals and operable in its other state to enable the transmission circuits for the other group of signals, and means responsive to the transmitted signals is provided to transfer the bistable device from one state to the other.

In accordance with one feature of the invention, the resulting signals from the several enabling devices are sequentially applied to a multi-input OR circuit, and the output therefrom is employed to control the state of the bistable device. The coded signals appear in serial form at the output terminal of this OR circuit and constitute an accurate representation of the transmitted intelligence.

In accordance with another feature of this invention, the bistable device is adapted to enable the transmission circuits corresponding to either the first group of coded signals or the second group of coded signals, the group selected depending upon the information appearing at the output of the OR circuit representing the previous digit sensed. The device is thus adapted to prepare the apparatus for selecting the particular signal corresponding to the desired binary code output, and the possibility of signal ambiguity is substantially eliminated.

The present invention as well as further objects and features thereof will be understood more clearly and fully from the following detailed description of a preferred embodiment thereof when read with reference to the accompanying drawings, in which:

FIGURE 2 is illustrative of a device useful in connection with the apparatus of FIGURE 1 to translate information representative of rotational motion into information represented by coded signals;

FIGURE 3 is a side view of the device shown in FIGURE 2;

FIGURE 4 is a table illustrative of the binary representation corresponding to successive sector increments of the measured motion;

FIGURE 5 is illustrative of a device, partially broken away for convenience, useful in connection with the apparatus of FIGURE 1 to translate information representative of longitudinal motion into information represented by coded signals;

FIGURE 7 shows typical voltage wave forms, in timed relation, supplied to the apparatus of FIGURE 1 in accordance with the invention.

Figure 1:
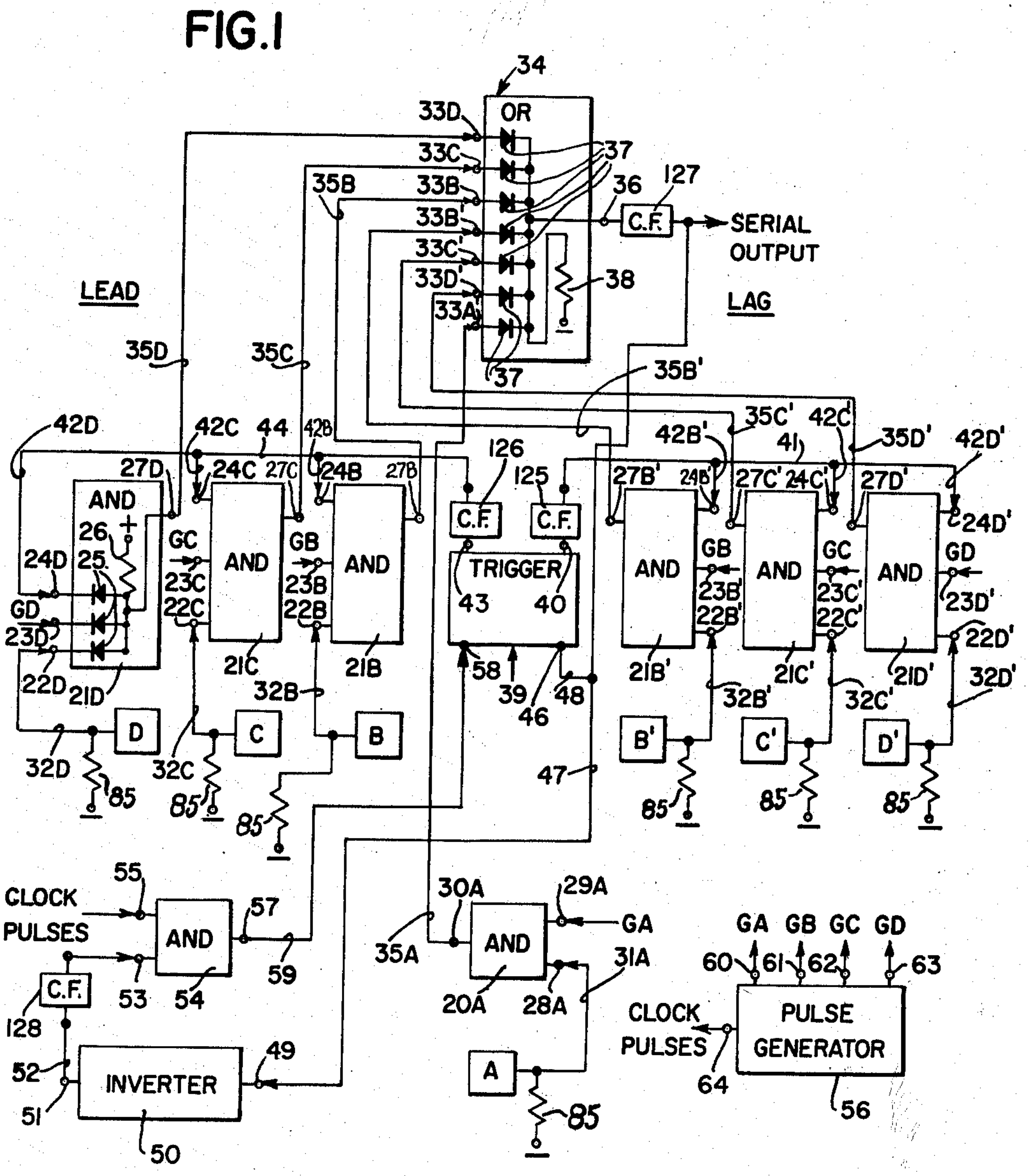
FIGURE 1 is a schematic block diagram of a preferred information-handling apparatus constructed in accordance with the invention.

In the drawings there is shown a plurality of terminals, such as brushes A, B, B′, C, C′, D and D′, which contain electrical signals representative of successive digits in a standard binary code. Brushes B, C and D are arranged in one group, while brushes B′, C′ and D′ are disposed in another group. Brush A is common to each group and contains information representative of the least significant digit in a binary code. The next significant coded digit is represented either by the brush B or by the brush B′, the next either by the brush C or by the brush C′ and the last digit in a four-digit code either by the brush D or by the brush D′.

In order to facilitate the description of the embodiment of the invention illustrated in FIGURE 1, there will first be given a brief analysis of the coding arrangement of brushes A, B, B′, C, C′, D and D′, together with a description of representative sources from which the signals thereon are obtained. That is, before describing the novel system for sensing and serializing the signals appearing on these brushes, a description will be given of known analog-to digital apparatus for producing such signals on such brushes. For a more detailed discussion of representative apparatus with which the present invention advantageously may be employed, reference may be had to Notes on Analog-Digital Conversion Techniques, edited by A. K. Susskind and published jointly by The Technology Press of Massachusetts Institute of Technology and John Wiley & Sons, Inc., New York City.

*FIGURES 2 and 3*

As shown in FIGURES 2 and 3 of the drawings, a disc 16 is keyed or otherwise rigidly affixed to a shaft 16*a*, the angular position of which is to be measured and converted into a series of pulses representative of a digital code. The disc 16 is divided into a pluralty of wedge shaped sectors, numbered consecutively from 0 to 15 in the drawings, which extend radially from the shaft 16*a* and correspond to the increments of analog motion which are to be converted into a digital representation. Although sixteen such segments have been shown on disc 16, any desired number may be employed, depending upon the resolution or accuracy desired. Thus, the greater the number of segments on disc 16, the higher will be the resolution of the conversion apparatus.

Each of the sectors 0 through 15 of disc 16 is divided into a plurality of conductive portions 17 and/or insulating portions 18, the number of portions in each sector corresponding to the number of digits in the desired binary code. As shown in FIGURE 2 and with reference to the table of FIGURE 4, the portions in each disc sector are arranged in accordance with a number in the binary code, with a conductive portion 17 representative of a binary "one" and a non-conductive portion 18 representative of a binary "zero." The outermost ring of portions 17 and 18 on disc 16 is representative of the least significant digit in the code, the portions 17 and 18 in the ring immediately adjacent thereto are representative of the next least significant digit, the next ring of portions represents the next significant digit, and the innermost ring of portions 17 and 18 is representative of the most significant coded digit. Thus, for example, the sector 10, which is representative of the binary number 1010, includes a non-conductive portion 18 in the outermost ring, a conductive portion 17 in the next ring, a non-conductive portion 18 in the next and a conductive portion 17 in the innermost ring.

The conductive portions 17 of the disc 16 are adapted to be supplied with a suitable electrical potential, which in this illustration may be assumed to be a positive potential, and the disc 16 is adapted for counter-clockwise rotation, as viewed in FIGURE 2. Thus, as shown in FIGURE 3, a circular plate 80 of electrically conductive material is positioned in abutting relationship with the disc 16 and is likewise rigidly affixed to the shaft 16*a*. A brush 81, which is supplied with a positive electrical potential by means of a battery 82 and a conductor 83, is held against the plate 80 by a coil spring 84. During rotation of the shaft 16*a*, the brush 81 remains fixed and in electrically conductive relationship with the conductive portions 17 of the disc 16. The positive potential of the battery 82 is thereby transmitted through the conductor 83, the brush 81, and the plate 80 to the portions 17.

The brushes A, B, B′, C, C′, D and D′ are positioned in fixed relation to an imaginary reading index line 19 (FIGURE 2) which is stationary relative to the disc 16. The information contained in the sector of disc 16 adjacent the index line 19 is indicative of the amount of rotation of disc 16 and hence of the angular position of the shaft 16*a*. Brush A is positioned directly on the index line 19 and is in contact with the disc portion 17 or 18 in the disc sector adjacent line 19 for the purpose of indicating the least significant digit in the binary code. Brushes B, C and D, which are referred to as the "leading" brushes, are spaced from the index line 19 in the direction of increasing sector count and are each in contact with a succeeding disc portion 17 or 18. Brushes B′, C′ and D′, which are referred to as the "lagging" brushes, are spaced from the index line 19 in the direction of decreasing sector count and are also in contact with the succeeding disc portion 17 or 18. As shown in the drawings, the brushes B and B′ each are spaced from index line 19 by a distance equal to one-half the circumferential width of the disc portion 17 or 18 thereadjacent. Brushes C and C′ each are spaced from line 19 by a distance equal to the circumferential width of the corresponding portion 17 or 18 and brushes D and D′ each are spaced from the line 19 by a distance equal to twice the circumferential width of the portion 17 or 18 adjacent these brushes.

In order to read the information contained on disc 16, it would of course be desirable to employ only four brushes disposed along the index line 19, one for each of the four rings of portions 17 or 18 corresponding to the digits in a four-digit code. However, such an arrangement would require infinitely narrow brushes and perfect alignment of the brushes along index line 19. Thus, should the rotating disc 16 come to a stop in a manner such that the index line 19 is in sector 4, for example, but adjacent the border line between sectors 3 and 4, one or more of the brushes might produce an ambiguous reading. For example, the brush representative of the next least significant digit, particularly if this brush is slightly out of line in the direction of decreasing sector count, may overlap into sector 3 and thereby have an electrical potential thereon, indicating the presence of a binary "one" when the desired binary signal is "zero."

To overcome signal ambiguities of this type, the single brush A is used on the outermost portion ring representative of the least significant coded digit, and two brushes B and B′, C and C′ and D and D′ are used for each of the remaining rings of disc portions. As indicated above, these brush pairs are moved progressively farther away from line 19 as the digits represented thereby become more significant. With reference to the table in FIGURE 4, it is noted that whenever a particular digit in the binary code changes from "zero" to "one" the next significant digit in the direction of increasing sector number count remains the same. Thus, if a particular brush is on a non-conductive portion 18 of the disc 16 and hence is indicative of a binary "zero" in a given binary number, the brush that is representative of the next significant digit in the binary number will be a brush that is in the direction of increasing sector number count: i.e., a leading brush. Conversely, whenever a particular digit in the binary code changes from "one" to "zero," the next significant digit in the direction of decreasing sector number count remains the same. Hence, if a particular brush is on a conductive portion 17 of disc 16 and thereby indicates a binary "one," the brush that is representative of the next significant digit will be a brush that is in the direction of decreasing sector number count: i.e., a lagging brush.

Figure 6:
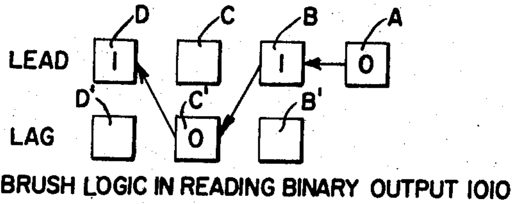
FIGURE 6 is illustrative of the logic employed in reading the appartus of FIGURE 1.

From the foregoing it will be apparent that whenever the binary digit represented by a particular brush is "zero," a leading brush should be selected as representative of the next significant digit. Whenever the binary digit represented by a particular brush is "one," on the other hand, a lagging brush should be selected for the next significant digit. Suppose, for example, that the disc 16 comes to rest with the reading index line 19 in sector 10, as shown in FIGURE 2, and thus is representative of the binary number 1010. The brush A is properly on a non-conducting portion 18 and is indicative of a binary "zero" which constitutes the least significant digit in the number 1010. In accordance with the foregoing analysis, the next least significant digit should be read from the leading brush B, and this brush properly indicates the presence of a binary "one." The lagging brush B′, on the other hand, erroneously represents a binary "zero." Since a binary "one" is read on brush B, the next digit should be read from the lagging brush C′, and, since brush C′ is on a non-conductive portion 18 and hence represents a binary "zero," the most significant digit should be read from the leading brush D. Thus, as shown schematically in FIGURE 6, the binary number 1010 is read by reading the least significant digit from brush A, the next least significant digit from brush B, the next digit from brush C′ and the most significant digit from brush D.

*FIGURE 1*

The apparatus of FIGURE 1 is adapted to read the information on the various brushes in accordance with the desired reading sequence outlined above. In this figure, related components associated with each of the brushes A, B, B′, C, C′, D and D′ have been identified by the same numerical character followed by an alphabetical suffix indicative of the particular brush with which the component is associated.

Each of the brushes A, B, B′, C, C′, D and D′ is connected to a corresponding coincidence circuit, such as AND circuits 20A, 21B, 21B′, 21C, 21C′, 21D and 21D′, respectively. These AND circuits each include a plurality of input terminals and are adapted to produce an output pulse only when a voltage signal of appropriate magnitude appears at each of the input terminals. Thus, as shown with respect to AND circuit 21D which is representative of the general mode of operation of each of the AND circuits shown in the drawings, a plurality of input terminals 22D, 23D and 24D are respectively connected to the cathodes of an equal number of germanium diode rectifiers 25. The anodes of rectifiers 25 are each connected to one end of a resistor 26, the other end of which is attached to a suitable source of positive potential. AND circuit 21D additionally includes an output terminal 27D which is connected to the common terminal of the anodes of rectifiers 25 and the one end of resistor 26. The electrical potential at output terminal 27D will be equal to the lower of the potentials at input terminals 22D, 23D or 24D, and the potential at the output terminal 27D will be relatively positive only when appropriate voltage signals appear at each of the input terminals 22D, 23D and 24D.

The AND circuit 20A includes two input terminals 28A and 29A and an output terminal 30A, the input terminal 28A being connected to the brush A by a conductor 31A. AND circuits 21B, 21B′, 21C, 21C′, 21D and 21D′ each include three input terminals 22, 23 and 24 and an output terminal 27, the numerical designation of these terminals in each case being followed by the appropriate alphabetical suffix in the drawings. Brushes B, B′, C, C′, D and D′ are connected to the corresponding input terminals 22 by means of conductors 32B, 32B′, 32C, 32C′, 32D and 32D′, respectively.

Each of the conductors 31A, 32B, 32B′, 32C, 32C′, 32D and 32D′ is connected through a corresponding resistor 85 to a source of negative electrical potential. In one illustrative example, the value of this potential may be of the order of minus 60 volts, for a positive voltage of 140 volts applied to the resistor 26 in each of the AND circuits 20A, 21B, 21B′, 21C, 21C′, 21D and 21D′. In this illustrative example, the voltage supplied by the battery 82 (FIGURE 3) to the brushes A, B, B′, C, C′, D and D′ when one or more of these brushes is on a conductive portion 17 of the disc 16 may be approximately 10 volts. Of course, the particular voltages employed will depend upon such factors as the various circuit parameters, desired operating characteristics, etc., and thus other appropriate voltages may be employed without departing from the spirit and scope of the invention.

The output terminal 30A of AND circuit 20A is connected to one input terminal 33A of a multi-input OR circuit 34 by a conductor 35A. OR circuit 34 includes additional input terminals 33B, 33B′, 33C, 33C′, 33D and 33D′ which are respectively connected to output terminals 27B, 27B′, 27C, 27C′, 27D and 27D′ of the AND circuits by means of conductors 35B, 35B′, 35C, 35C′, 35D and 35D′. The OR circuit 34 also includes an output terminal 36 that is adapted to produce a single output pulse when a voltage pulse is received at any one of the input terminals 33A, 33B, 33B′, 33C, 33C′, 33D or 33D′. Thus, the input terminals of OR circuit 34 are respectively connected to the anodes of an equal number of diode rectifiers 37, and the cathodes of rectifiers 37 are each connected to one end of a resistor 38, the other end of which is attached to a suitable source of negative potential. In the illustrative example referred to above, the value of this potential may be of the order of minus 130 volts. The common terminal of the cathodes of rectifiers 37 and of the one end of resistor 38 is connected to the output terminal 36. The potential at output terminal 36 will be relatively positive when a voltage pulse is received at any one of the input terminals 33A, 33B, 33B′, 33C, 33C′, 33D or 33D′.

Figure 8:
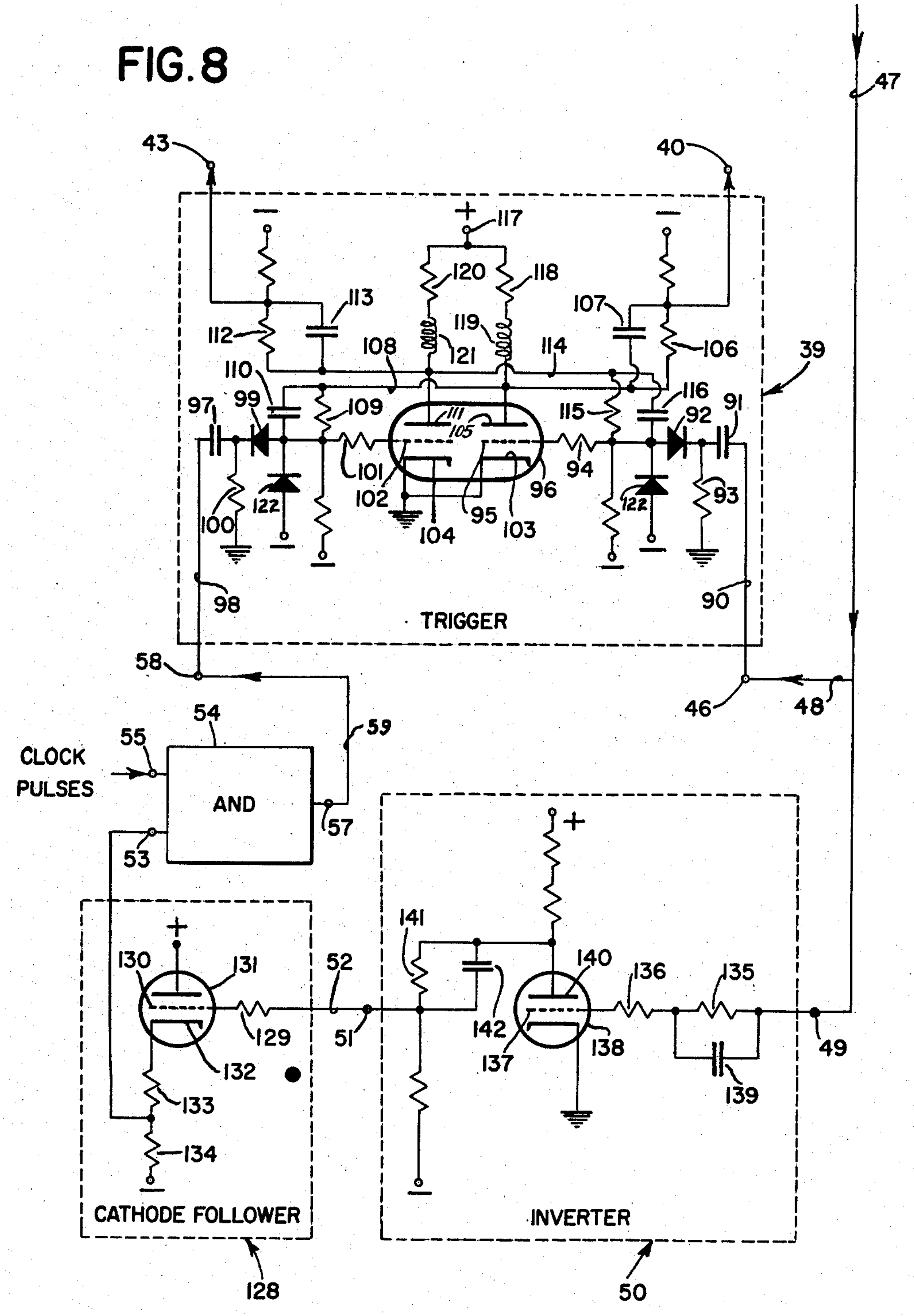
FIGURE 8 is a schematic diagram of portions of the apparatus shown in FIGURE 1.

In order to select the particular brush group containing the desired code digit in accordance with the reading sequence outlined heretofore, there is provided a trigger circuit 39 which, as shown in detail in FIGURE 8, may comprise a bistable circuit of the flip-flop type. The trigger 39 includes an input terminal 46 adjacent the right side thereof, as viewed in the drawings, which is connected by means of a conductor 90 to one terminal of a capacitor 91, the other terminal of which is connected to the cathode of a diode rectifier 92 and to ground through a resistor 93. The anode of the rectifier 92 is connected through a resistor 94 to one grid 95 of a double triode 96. Trigger 39 additionally includes an input terminal 58 adjacent the left side thereof which is connected in a similar manner to one terminal of a capacitor 97 by a conductor 98. The other terminal of capacitor 97 is connected to the cathode of a diode rectifier 99 and to ground through a resistor 100. The anode of the rectifier 99 is led through a resistor 101 to the other grid 102 of the double triode 96, the cathodes 103 and 104 of which are connected to ground.

One anode 105, on the side of the double triode 96 adjacent the grid 95, is connected to an output terminal 40 of the trigger 39 through a resistor 106 connected in parallel with a capacitor 107. The anode 105 is cross-coupled to the circuit of grid 102 of double triode 96 by a conductor 108 which is connected to a common terminal of a resistor 109 and a capacitor 110 which are in parallel with each other. The free terminals of resistor 109 and capacitor 110 are connected to the junction between the anode of the rectifier 99 and the resistor 101. The other anode 111, on the side of the double triode 96 adjacent the grid 102, is connected in a similar manner to an output terminal 43 of trigger 39 through a resistor 112 in parallel with a capacitor 113. Anode 111 is cross-coupled to the circuit of grid 95 by means of a conductor 114 and a resistor 115 in parallel with a capacitor 116. Anode 105 is supplied with a suitable positive plate voltage from a terminal 117 through a resistor 118 and an inductance winding 119, while anode 111 receives this plate voltage from the terminal 117 through a resistor 120 and an inductance winding 121.

The double triode 96 of trigger 39 is adapted to remain in one stable state with one set of electrodes conducting and the other set non-conducting until the termination of a positively directed voltage pulse at the input terminal 46 or 58 adjacent the conducting side, at which time the trigger 39 "flips over" with the other set of electrodes in a conducting state. The resistor 93 and the capacitor 91 adjacent the input terminal 46 and the resistor 100 and the capacitor 97 adjacent the input terminal 58 serve to differentiate the incoming signals from terminals 46 and 58, while diode rectifiers 92 and 99 prevent the positive portions of the differentiated signals from appearing on the respective grids 95 and 102. Thus, for example, if it be assumed that the left side of the double triode 96, as viewed in FIGURE 8, is nonconducting and the right side is in its conducting state, a relatively positive voltage appears at anode 111 and hence at output terminal 43 while a lower voltage appears at output terminal 40. Upon the receipt at the input terminal 46 of a positively directed voltage pulse, which here may be assumed to be in the form of a square wave, the resistor 93 and the capacitor 91 convert this wave into a positively directed pulse at the beginning of the signal and a negatively directed pulse upon the termination of the signal. The rectifier 92 permits only the negatively directed pulse to appear on the grid 95, and the decreased potential on this grid cuts off the right side of double triode 96 simultaneously with the termination of the signal at input terminal 46. The resulting increased potential of the anode 105 appears at output terminal 40 and also serves to raise the voltage on the grid 102, thereby causing the left side of the double triode 96 to conduct.

The trigger 39 continues to change from one stable state to the other upon the termination of a positively directed voltage pulse at the input terminal adjacent the conducting side of the double triode 96. The state of the trigger 39 remains unchanged, however, should a positively directed voltage pulse appear at the input terminal adjacent the nonconducting side of the double triode 96, since the differentiation of this pulse and rectification by rectifier 92 or 99 operate to lower the potential on the grid thereadjacent and thus maintain the appropriate side of double triode 96 in its non-conductive state. In order to prevent the grids 95 and 102 from going too far negative and thereby slowing down the operation of the trigger, each grid is respectively connected to the cathodes of diode rectifiers 122. The anodes of these rectifiers are connected to suitable sources of negative potential.

As shown in FIGURE 1, the output terminal 40, adjacent the right side of the trigger 39, is connected through a suitable cathode follower power stage 125 to the input terminals 24B′, 24C′ and 24D′ of AND circuits 21B′, 21C′ and 21D′, respectively, by means of a conductor 41 and branch conductors 42B′, 42C′ and 42D′. The output terminal 43, adjacent the left side of the trigger 39, is connected through a cathode follower 126 to input terminals 24B, 24C and 24D, respectively, by a conductor 44 and branch conductors 42B, 42C and 42D.

The input terminal 46 adjacent the right side of trigger 39 is connected to one terminal of a cathode follower 127 by a conductor 47 and a branch conductor 48. The other terminal of the cathode follower 127 is connected to the output terminal 36 of OR circuit 34. The conductor 47 extends from the cathode follower 127 and past branch conductor 48 to an input terminal 49 of an inverter 50. The inverter 50 is adapted to generate a positively directed electrical potential at an output terminal 51 thereof upon the appearance of a relatively negative potential at input terminal 49. Thus, as shown in detail in FIGURE 8, the input terminal 49 of inverter 50 is connected through resistors 135 and 136 to the grid 137 of a three-element electron tube 138. The resistor 135 is shunted by means of a condenser 139. The anode 140 of tube 138 is supplied with a suitable source of plate voltage and is connected to the output terminal 51 of inverter 50 through a resistor 141 which is shunted by a condenser 142. Upon the appearance of a relatively negative potential at the input terminal 49, the decreased voltage on the grid 137 causes an increased voltage to appear at anode 140 and hence at output terminal 51. The receipt of a positively directed voltage pulse at the inverter input terminal 49, on the other hand, results in a lower potential at output terminal 51.

The output terminal 51 of inverter 50 is connected by a conductor 52 and a resistor 129 to the grid 130 of a three-element electron tube 131 in a cathode follower power stage 128. The cathode 132 of the tube 131 is supplied with a suitable source of negative potential through series connected resistors 133 and 134, the common terminal of which comprises the output terminal of the cathode follower. The construction of the cathode follower 128 is illustrative of that of the cathode followers 125, 126 and 127 shown in FIGURE 1 of the drawings, and, for some applications, one or more of these cathode followers may be omitted from the circuit without deleterious effect.

The common terminal of the resistors 133 and 134 in the cathode follower 128 is connected to one input terminal 53 of an AND circuit 54, the other input terminal 55 of which is adapted to receive a series of equally spaced clock pulses from a pulse generator 56 (FIGURE 1), as will be described more fully hereafter. AND circuit 54 additionally includes an output terminal 57 which is connected to the input terminal 58 on the left side of the trigger 39 by a conductor 59.

The pulse generator 56 is adapted to supply a plurality of positively directed gate pulses GA, GB, GC and GD, corresponding in number to the number of digits in the particular binary code, sequentially to first the AND circuit corresponding to the brush A and then to the AND circuits corresponding to each of the brush pairs B and B′, C and C′ and D and D′. Generator 56 is additionally adapted to supply the series of equally spaced clock pulses to the AND circuit 54. Although the various connecting conductors have been omitted in the drawings for purposes of clarity, it will be understood that an appropriate connection is made for gate pulses GA between an output terminal 60 of generator 56 and the input terminal 29A of AND circuit 20A. Similarly, connections exist between a generator output terminal 61 and input terminals 23B and 23B′ of AND circuits 21B and 21B′, respectively, for gate pulses GB; between a generator output terminal 62 and input terminals 23C and 23C′ of AND circuits 21C and 21C′, respectively, for gate pulses GC; and between a generator output terminal 63 and input terminals 23D and 23D′ of AND circuits 21D and 21D′, respectively, for gate pulses GD. The clock pulses are supplied from the pulse generator 56 to the AND circuit 54 by means of a connection (not shown) between a clock pulse output terminal 64 on generator 56 and the input terminal 55 of AND circuit 54.

The wave forms of the gate pulses GA, GB, GC and GD and of the clock pulses, and their timed relation to one another, is shown in FIGURE 7. The gate pulses are generated by generator 56 in sequence at a frequency corresponding to the desired reading frequency of the coded digits and are adapted to thereby condition AND circuits 20A, 21B, 21B′, 21C, 21C′, 21D and 21D′ for the reading operation. Thus, to condition AND circuit 20A for reading the information contained on brush A, pulse GA is generated and is applied to the input terminal 29A. At the termination of the pulse GA, pulse GB is generated and is applied to input terminals 23B and 23B′ to condition AND circuits 21B and 21B′. At the termination of the pulse GB, the pulse GC is generated by generator 56 and is applied to input terminals 23C and 23C′ to condition AND circuits 21C and 21C′ and thus permit the reading of information on either brush C or brush C′. Similarly, the pulse GD is generated at the termination of the pulse GC and is applied to input terminals 23D and 23D′ of AND circuits 21D and 21D′, thereby conditioning these circuits for the reading of information on either brush D or brush D′. In this manner, the production of a series of sequential pulses at the output terminal 36 of OR circuit 34 is assured.

The clock pulses are likewise generated by the generator 56 at a frequency corresponding to the desired reading frequency of the coded digits and are adapted to condition the AND circuit 54 during a time when any one of the gate pulses GA, GB, GC or GD is conditioning the AND circuits corresponding thereto. Each clock pulse is of a duration shorter than that of the gate pulses, and the termination of each of the clock pulses occurs at the termination of the corresponding gate pulse, for purposes to appear hereinafter.

*Operation*

The circuit of FIGURE 1 is adapted to select the leading brush group B, C and D, or the lagging brush group B′, C′ and D′, depending upon which group contains the appropriate brush in accordance with the desired reading sequence outlined above. At the beginning of each word to be read, the trigger 39 is set with the side of the double triode 96 (FIGURE 8) adjacent leading brushes B, C and D non-conducting and the side adjacent lagging brushes B′, C′ and D′ in its conducting state. The relatively positive electrical potential of the anode 111 is supplied from the output terminal 43 of trigger 39, through the conductor 44 and branch conductors 42B, 42C and 42D, to input terminals 24B, 24C and 24D of AND circuits 21B, 21C and 21D, respectively. The AND circuits 21B, 21C and 21D are thus conditioned to read the information contained on brushes B, C and D, while no conditioning potential is received from trigger 39 by the input terminals 24B′, 24C′ and 24D′ of AND circuits 21B′, 21C′ and 21D′.

Suppose, for example, that the disc 16 of FIGURES 2 and 3 comes to rest in the position shown: i.e., with the reading index line 19 adjacent sector 10 and indicative of the binary number 1010. In this position, the brushes B, D and D′ are in contact with conductive portions 17 and thus have a relatively positive electrical potential thereon supplied by the battery 82. The potential on brush B is transmitted to the input terminal 22B of AND circuit 21B (FIGURE 1) by the conductor 32B, thus conditioning this AND circuit for the reading operation. The potentials on brushes D and D′ are likewise transmitted to the input terminals 22D and 22D′ of AND circuits 21D and 21D′, respectively, by conductors 32D and 32D′. Brushes A, B′, C and C′, on the other hand, are in contact with non-conductive portions 18 of disc 16 and consequently are in electrically conductive relationship only with the respective resistors 85, which are connected to negative battery. The AND circuits 20A, 21B′, 21C and 21C′ corresponding to these latter brushes are thus rendered ineffective during the reading operation.

To read the information contained on the various brushes, the pulse generator 56 generates the sequential gate pulses GA, GB, GC and GD and the equally spaced clock pulses in the manner outlined heretofore and shown in FIGURE 7. The gate pulse GA is transmitted from the output terminal 60 of pulse generator 56 and is received by the AND circuit 20A at input terminal 29A. No positively directed pulse appears at the output terminal 30A of AND circuit 20A, however, since this AND circuit is not conditioned for the reading operation. The absence of a positively directed pulse at terminal 30A appears at the output terminal 36 of the OR circuit 34 and hence at the output terminal of the cathode follower 127 as a binary "zero" and is indicative of the least significant digit in the binary number 1010.

Since inverter 50 is adapted to produce a relatively positive electrical potential upon the absence of a positively directed pulse at its input terminal 49, which is connected to the output terminal of the cathode follower 127 by the conductor 47, a voltage pulse is transmitted from the output terminal 51 of inverter 50 through the cathode follower 128 to the input terminal 53 of AND circuit 54. AND circuit 54 is thereby conditioned to transmit clock pulses received at input terminal 55. Upon receipt of the first clock pulse from pulse generator 56, AND circuit 54 transmits this pulse from its output terminal 57 through conductor 59 to the input terminal 58 on the side of trigger 39 adjacent leading brushes B, C and D. However, this side of trigger 39 has been set in its non-conducting condition, and, as indicated heretofore, the incoming pulse on terminal 58 is differentiated and rectified with the result that the grid 102 (FIGURE 8) of the double triode 96 is driven in a negative direction. Consequently, the state of trigger 39 remains unchanged, and the trigger continues to apply a relatively positive potential from its output terminal 43 to AND circuits 21B, 21C and 21D.

Upon the termination of gate pulse GA, the gate pulse GB is transmitted from the output terminal 61 of pulse generator 56 to the input terminal 23B of AND circuit 21B and to the input terminal 23B′ of AND circuit 21B′. Since no conditioning signal is received at the input terminal 24B′ from the trigger 39 and since no relatively positive signal is received at input terminal 22B′ from the brush B′, AND circuit 21B′ is rendered ineffective and transmits no information to the OR circuit 34. However, the receipt of gate pulse GB at the input terminal 23B of AND circuit 21B enables this circuit to transmit a positively directed output pulse from the terminal 27B since a conditioning potential appears at input terminal 24B from the trigger 39 and at input terminal 22B from brush B. The positively directed output pulse from AND circuit 21B follows a path from the output terminal 27B thereof through the conductor 35B to input terminal 33B of the OR circuit 34. Consequently, a positively directed output pulse appears at the output terminal of the cathode follower 127 and is indicative of a binary "one," representing the second least significant digit in the binary number 1010.

The positively directed pulse appearing at the output terminal of the cathode follower 127 is also transmitted by means of conductors 47 and 48 to the input terminal 46 adjacent the right side of trigger 39, as viewed in FIGURES 1 and 8. The pulse on input terminal 46 is differentiated by means of the resistor 93 and the capacitor 91, and the positive portion of this differentiated pulse is cut off by the rectifier 92. Since the remaining portion of the differentiated pulse coincides with the termination of the incoming pulse, the trigger 39 remains in its existing state until the termination of the pulse on input terminal 46. At the termination of this pulse, however, the grid 95 of double triode 96 is driven in a negative direction and trigger 39 "flips" to its alternate state with the side adjacent the leading brushes B, C and D conducting, and with the side adjacent lagging brushes B′, C′ and D′ non-conducting. A relatively positive electrical potential is thereby transmitted from the plate 105 and output terminal 40 of trigger 39, through the conductor 41 and branch conductors 42B′, 42C′ and 42D′ to the input terminals 24B′, 24C′ and 24D′ of respective AND circuits 21B′, 21C′ and 21D′. The apparatus is thus conditioned for reading information on the lagging brushes.

Simultaneously with the termination of gate pulse GB, the gate pulse GC is transmitted from the output terminal 62 of the pulse generator 56 to the input terminal 23C of AND circuit 21C and to the input terminal 23C′ of AND circuit 21C′. No positively directed pulse is transmitted from the output terminal 27C of AND circuit 21C, however, since no conditioning potential appears at the input terminals 22C and 24C of this AND circuit. Additionally, although the input terminal 24C′ of AND circuit 21C′ is now receiving a relatively positive potential from the trigger 39, no positively directed pulse is transmitted to OR circuit 34 from the output terminal 27C′ since the lagging brush C′ is on a non-conductive portion 18 of disc 65 (FIGURE 2) and thus does not transmit a conditioning potential to the input terminal 22C′. As a result, the absence of a positively directed output pulse at the output terminal of the cathode follower 127 is indicative of a binary "zero" and represents the third least significant digit in the binary number 1010.

The absence of a positively directed pulse at the output terminal of the cathode follower 127 and hence at the input terminal 49 of the inverter 50 causes the triode 138 to produce a positively directed potential at output terminal 51. This positively directed potential is transmitted through the cathode follower 128 to the input terminal 53 of AND circuit 54, and AND circuit 54 is thereby conditioned to transmit the clock pulse corresponding to the gate pulse GC. Upon the generation of this clock pulse, it is transmitted by AND circuit 54 from the output terminal 57 thereof, through conductor 59 to the input terminal 58 on the conducting side of trigger 39 adjacent leading brushes B, C and D. Upon the termination of the clock pulse at terminal 58, the trigger 39 returns to its initial state with the side adjacent leading brushes B, C and D non-conducting, and the side adjacent lagging brushes B′, C′ and D′ conducting. Thus, trigger 39 again supplies a relatively positive potential from the output terminal 43 through conductor 44 and branch conductors 42B, 42C and 42D to the input terminals 24B, 24C and 24D of AND circuits 21B, 21C and 21D, respectively. These AND circuits, corresponding to the leading brushes B, C and D, are hence in condition to transmit information from the leading brushes, while no information can be transmitted through the AND circuits corresponding to the lagging brushes B′, C′ and D′.

Upon the termination of gate pulse GC, the gate pulse GD is transmitted from the output terminal 63 of pulse generator 56 to the input terminal 23D of AND circuit 21D and to the input terminal 23D′ of AND circuit 21D′. No positively directed pulse is transmitted from the output terminal 27D′ of AND circuit 21D′, however, since no conditioning potential is supplied to the input terminal 24D′ from trigger 39. All three of the input terminals 22D, 23D and 24D of AND circuit 21D, on the other hand, have a conditioning potential thereon. Consequently, a positively directed pulse is transmitted from the output terminal 27D through the conductor 35D to the input terminal 33D of OR circuit 34. This positive pulse appears at OR circuit output terminal 36 and hence at the output terminal of the cathode follower 127 as indicative of a binary "one" and represents the most significant digit in the binary number 1010.

In view of the foregoing, it will be apparent that the circuit of FIGURE 1 is adapted to select the particular brush containing the correct binary digit thereon and to read the brush information in serial form. The presence of a binary "zero" on a brush being read, which may be either a leading brush B, C or D or a lagging brush B′, C′ or D′, maintains the trigger 39 with the side adjacent the leading brushes non-conducting and the side adjacent the lagging brushes conducting upon the termination of the binary "zero" at the output terminal of the cathode follower 127, thereby conditioning AND circuits 21B, 21C and 21D for the reading of the next significant digit from a leading brush. On the other hand, the existence of a binary "one" on a brush being read, which may be either a leading or a lagging brush, causes the trigger 39 to flip over, if it is not already in this condition, upon the termination of the binary "one" at output terminal 36, with the side adjacent the lagging brushes non-conducting and the side adjacent the leading brushes conducting. AND circuits 21B′, 21C′ and 21D′ are thereby conditioned to read the next significant digit from one of the lagging brushes B′, C′ and D′, while the presence of a binary "one" on any of the leading brushes B, C or D is rendered ineffective. The arrangement is such that a signal corresponding to a binary "one" or "zero" at the output terminal of the apparatus is returned to the input of the trigger 39 to determine the state of the trigger output, thus selecting the next significant digit from either a leading or a lagging brush.

*FIGURE 5*

Referring now to FIGURE 5 of the drawings, there is shown, as an alternative for the apparatus of FIGURES 2 and 3, a plate 73 that is particularly advantageous in connection with the representation of longitudinal motion by a series of sequential binary pulses. The plate 73 is adapted to move in a vertical direction, as viewed in FIGURE 5, and is divided into a plurality of equally spaced, horizontally disposed sectors which correspond to the sectors 0 to 15 of FIGURE 2. Each sector is divided into conductive portions 74 and non-conductive portions 75, there being four portions in each sector, which represent the digits in a four-digit binary code. An imaginary stationary reading index line 76 is disposed in a direction parallel to that of the various code sectors, and brushes A, B′, C, C′, D and D′ are disposed thereabout in a manner similar to that shown with respect to the index line 19 in FIGURE 2.

As the plate 73 comes to rest after longitudinal vertical movement thereof, a particular sector, such as sector 10, will be in juxtaposition to the reading index line 76. The code designation of the sector, such as the binary number 1010 of section 10, is transmitted to the various brushes and is read in serial form by the apparatus of FIGURE 1 in a manner similar to that described heretofore.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In an apparatus for converting analog information to digital information including a plurality of terminals and means for applying to said terminals signals representative of digital information, in combination, a first terminal for sensing a signal representative of a first digit, a terminal pair including a second terminal and a third terminal for sensing a signal representative of a second digit, means including a multi-input OR circuit for providing a single output common to all of said terminals, a plurality of coincidence circuits, a single one of said coincidence circuits being provided for each of said terminals, each of said coincidence circuits having a plurality of inputs and an output connected to one of the inputs of said OR circuit, one input of each of said coincidence circuits being connected to one of said terminals, a bistable electronic device having an input connected to said single common output, said bistable device having one output connected to another input of the coincidence circuit of said second terminal for applying an enabling signal thereto when said device is in one of its stable conditions and said bistable device having another output connected to another input of the coincidence circuit of said third terminal for applying an enabling signal thereto when said device is in its other stable condition, to thereby selectively condition the coincidence circuits of said terminal pair for producing at said OR circuit output digital information representative of the information on the selected terminal, and means connected to another input of the coincidence circuit of said first terminal and to a third input of the coincidence circuits of said terminal pair for enabling first the coincidence circuit of said first terminal and then the coincidence circuits of said terminal pair to produce sequential digital signals at said single common output respectively representative of the information appearing at said first terminal and at the selected terminal of said pair.

2. In an apparatus for converting analog information to digital information including a plurality of terminals and means for applying to said terminals signals representative of digital information, in combination, a first terminal for sensing a signal representative of a first digit, a terminal pair including a second terminal and a third terminal for sensing a signal representative of a second digit, another terminal pair including a fourth terminal and a fifth terminal for sensing a signal representative of a third digit, means including a multi-input OR circuit for providing a single output common to all of said terminals, a plurality of coincidence circuits, one for each of said terminals, each of said coincidence circuits having a plurality of inputs and an output connected to one of the inputs of said OR circuit, one input of each of said coincidence circuits being connected to one of said terminals, a bistable electronic device having an input connected to said single common output, said bistable device having first output means directly connected to another input of the coincidence circuit of said second terminal and said fourth terminal for simultaneously applying an enabling signal thereto when said device is in one of its stable conditions and said bistable device having second output means directly connected to another input of the coincidence circuits of said third terminal and said fifth terminal for simultaneously applying an enabling signal thereto when said device is in its other stable condition, the condition of said bistable electronic device depending upon the information appearing at said OR circuit output representative of the immediately preceding digit sensed, and a pulse generator connected to another input of the coincidence circuit of said first terminal and to a third input of the coincidence circuits of said one terminal pair and said other terminal pair for applying gating pulses to said coincidence circuits sequentially, said generator being adapted to enable first the coincidence circuit of said first terminal, then the coincidence circuits of said one terminal pair and then the coincidence circuits of said other terminal pair to produce digital information in serial form at said single common output representative of the information appearing at selected ones of said terminals in accordance with a predetermined rule.

3. In an apparatus for converting analog information to digital information including a plurality of terminals and means for applying to said terminals signals representative of digital information, in combination, a first terminal for sensing a signal representative of a first digit, a terminal pair including a second terminal and a third terminal for sensing a signal representative of a second digit, means including a multi-input OR circuit for providing a single output common to all of said terminals, a plurality of coincidence circuits, one for each of said terminals, each of said coincidence circuits having a plurality of inputs and an output connected to one of the inputs of said OR circuit, one input of each of said coincidence circuits being connected to one of said terminals, each coincidence circuit being adapted to generate at the output thereof a signal corresponding to an overlap of signals applied to the plurality of inputs thereof, a bistable electronic device having an input and having one output connected to another input of the coincidence circuit of said second terminal for applying an enabling signal thereto when said device is in one of its stable conditions and said bistable device having another output connected to another input of the coincidence circuit of said third terminal for applying an enabling signal thereto when said device is in its other stable condition, to thereby selectively condition the coincidence circuits of said terminal pair for producing at said OR circuit output digital information representative of the information on the selected terminal, means connected to another input of the coincidence circuit of said first terminal and to a third input of the coincidence circuits of said terminal pair for enabling first the coincidence circuit of said first terminal and then the coincidence circuits of said terminal pair to produce sequential digital signals at said single common output respectively representative of the information appearing at said first terminal and at the selected terminal of said pair, and return means for connecting said single common output to the input of said bistable device to control the condition of said device, said condition depending upon the information appearing at said single common output representative of the immediately preceding digit sensed.

4. In an apparatus for converting analog information to digital information including a plurality of terminals and means for applying to said terminals signals representative of digital information, in combination, a first terminal for sensing a signal representative of a first digit, a terminal pair including a second terminal and a third terminal for sensing a signal representative of a second digit, means including a multi-input OR circuit for providing a single output common to all of said terminals, a plurality of coincidence circuits, one for each of said terminals, each of said coincidence circuits having a plurality of inputs and an output connected to one of the inputs of said OR circuit, one input of each of said coincidence circuits being connected to one of said terminals, each coincidence circuit being adapted to generate at the output thereof a signal corresponding to an overlap of signals applied to the plurality of inputs thereof, a bistable electronic device having a plurality of inputs and having one output connected to another input of the coincidence circuit of said second terminal for applying an enabling signal thereto when said device is in one of its stable conditions and said bistable device having another output connected to another input of the coincidence circuit of said third terminal for applying an enabling signal thereto when said device is in its other stable condition, to thereby selectively condition the coincidence circuits of said terminal pair for producing at said OR circuit output digital information representative of the information on the selected terminal, means connected to another input of the coincidence circuit of said first terminal and to a third input of the coincidence circuits of said terminal pair for enabling first the coincidence circuit of said first terminal and then the coincidence circuits of said terminal pair to produce sequential digital signals at said single common output respectively representative of the information appearing at said first terminal and at the selected terminal of said pair, first return means connecting said single common output to one input of said bistable device for maintaining said device in said one condition in response to the presence of a signal of one magnitude at said single common return output representative of the immediately preceding digit sensed, and second return means connecting said single common output to another input of said bistable device for maintaining said device in said other condition in response to the presence of a signal of a magnitude lower than said one magnitude at said single common output representative of the immediately preceding digit sensed.

5. In an apparatus as defined in claim 4, said second return means including means for inverting the signals of said lower magnitude at said single common output and applying said inverted signals to said other input of said bistable device.

6. In an apparatus as defined in claim 5, said second return means including an enabling device having a plurality of inputs and an output connected to said other input of said bistable device, said inverting means connected to one input of said enabling device, and a clock pulse generator connected to another input of said enabling device for applying a plurality of equally spaced pulses thereto.

7. In an apparatus for converting analog information to digital information including a plurality of brushes and means for applying to said brushes voltage signals representative of digital information, in combination, a first brush for sensing a signal representative of a first digit, a brush pair including a second brush and a third brush for sensing a signal representative of a second digit, another brush pair including a fourth brush and a fifth brush for sensing a signal representative of a third digit, means including a multi-input OR circuit for providing a single output terminal common to all of said brushes, a plurality of coincidence circuits, one for each of said brushes, each of said coincidence circuits having a plurality of input terminals and an output terminal connected to an input terminal of said OR circuit, one input terminal of each of said coincidence circuits being connected to one of said brushes, a bistable electron discharge device having an input terminal connected to said single common output terminal, said bistable device having one output terminal connected to another input terminal of the coincidence circuits of said second brush and said fourth brush for simultaneously applying an enabling signal thereto when said device is in one of its stable conditions and said bistable device having another output terminal connected to another input terminal of the coincidence circuits of said third brush and said fifth brush for simultaneously applying an enabling signal thereto when said device is in its other stable condition, the condition of said bistable electron discharge device depending upon the information appearing at said OR circuit output terminal representative of the immediately preceding digit sensed, and a pulse generator connected to another input terminal of the coincidence circuit of said first brush and to a third input terminal of the coincidence circuits of said one brush pair and said other brush pair for applying gating pulses to said coincidence circuits sequentially, said generator being adapted to enable first the coincidence circuit of said first brush, then the coincidence circuits of said one brush pair and then the coincidence circuits of said other brush pair to produce digital information in serial form at said single common output terminal representative of the information appearing at selected ones of said brushes in accordance with a predetermined rule.

8. In an apparatus for converting analog information to digital information including a plurality of brushes and means for applying to said brushes voltage signals representative of digital information, in combination, a brush A for sensing a signal representative of a first digit, a brush pair including a brush B and a brush B′ for sensing a signal representative of a second digit, another brush pair including a brush C and a brush C′ for sensing a signal representative of a third digit, means including a multi-input OR circuit for providing a single output terminal common to all of said brushes, a plurality of coincidence circuits, a single one of said coincidence circuits being provided for each of said brushes, each of said coincidence circuits having a plurality of input terminals and an output terminal connected to an input terminal of said OR circuit, one input terminal of each of said coincidence circuits being connected to one of said brushes, a bistable electron discharge device having a plurality of input terminals and having one output terminal connected to another input terminal of the coincidence circuits of said brushes B and C for simultaneously applying an enabling signal thereto when said device is in one of its stable conditions and said bistable device having another output terminal connected to another input terminal of the coincidence circuits of said brushes B′ and C′ for simultaneously applying an enabling signal thereto when said device is in its other stable condition, a pulse generator connected to another input terminal of the coincidence circuit of said brush A, connected to a third input terminal of the coincidence circuits of said one brush pair and connected to a third input terminal of the coincidence circuits of said other brush pair for applying gating pulses to said coincidence circuits sequentially, said generator being adapted to enable first the coincidence circuit of said brush A, then the coincidence circuits of said one brush pair and then the coincidence circuits of said other brush pair to produce digital information in serial form at said single common output terminal representative of the information appearing at selected ones of said brushes in accordance with a predetermined rule, first return means connecting said single common output terminal to one input terminal of said bistable device for maintaining said device in said one condition in response to the presence of a signal of one magnitude at said single common output terminal representative of the immediately preceding digit sensed, and second return means connecting said single common output terminal to another input terminal of said bistable device for maintaining said device in said other condition in response to the presence of a signal of a lower magnitude at said single common output terminal representative of the immediately preceding digit sensed.

9. In an apparatus for converting analog information to digital information including a plurality of brushes and means for applying to said brushes voltage signals representative of digital information in a binary code, in combination, a brush A for sensing a signal representative of the least significant digit in said code, a brush pair including a brush B and a brush B′ for sensing a signal representative of the next least significant digit in said code, another brush pair including a brush C and a brush C′ for sensing a signal representative of the next significant digit in said code, means including a multi-input OR circuit for providing a single output terminal common to all of said brushes, a plurality of AND circuits, one for each of said brushes, each of said AND circuits having a plurality of input terminals and an output terminal connected to an input terminal of said OR circuit, one input terminal of each of said AND circuits being connected to one of said brushes, each AND circuit being adapted to generate at the output terminal thereof a signal corresponding to an overlap of signals applied to the plurality of input terminals thereof, a bistable electron discharge device having a plurality of input terminals and having one output terminal connected to another input terminal of the AND circuits of said brushes B and C for simultaneously applying an enabling signal thereto when said device is in one of its stable conditions and said bistable device having another output terminal connected to another input terminal of the AND circuits of said brushes B′ and C′ for simultaneously applying an enabling signal thereto when said device is in its other stable condition, to thereby selectively condition the AND circuits of each brush pair for producing at said OR circuit output terminal coded digital information representative of the information on the selected brush, a pulse generator connected to another input terminal of the AND circuit of said brush A, connected to a third input terminal of each of the AND circuits of said one brush pair and connected to a third input terminal of each of the AND circuits of said other brush pair for applying equally spaced gating pulses to said AND circuits sequentially, said generator being adapted to enable first the AND circuit of said brush A, then the AND circuits of said one brush pair and then the AND circuits of said other brush pair to produce coded digital information in serial form at said single common output terminal representative of the information appearing at selected ones of said brushes in accordance with a predetermined rule, first return means connecting said single common output terminal to one input terminal of said bistable device for maintaining said device in said one condition in response to a binary one at said single common output terminal representative of the immediately preceding digit sensed, and second return means connecting said single common output terminal to another input terminal of said bistable device for maintaining said device in said other condition in response to a binary zero at said single common output terminal representative of the immediately preceding digit sensed.

10. In an apparatus as defined in claim 9, said second return means including means for generating a signal in response to a binary zero at said single common output terminal and said second return means including an AND circuit having a plurality of input terminals and an output terminal connected to said other input terminal of said bistable device, said generating means connected to one input terminal of the AND circuit of said second return means, and a clock pulse generator connected to another input terminal of the AND circuit of said second return means for applying a plurality of enabling clock pulses thereto, each of said clock pulses being applied during the application of one of said gating pulses to the AND circuits of said brushes.

11. In an apparatus for converting analog information to digital information, in combination, means for simultaneously translating a series of analog signals to corresponding coded signals representative of digital information, a first terminal for sensing a first of said coded signals representative of a first digit, a terminal pair including a second terminal and a third terminal for sensing a second of said coded signals representative of a second digit, a single output common to all of said terminals, a plurality of AND circuits for respectively connecting said terminals to said single common output, each of said AND circuits having a pair of inputs and an output, a single one of said AND circuits being provided for each of said terminals, means for applying an enabling signal to the AND circuit for said first terminal, a bistable electronic device, and return means directly connected between said single common output and the output of said bistable device for controlling the same, said bistable device having first output means directly connected to the AND circuit for said second terminal to apply an enabling signal thereto when said device is in one of its stable conditions and having second output means directly connected to the AND circuit for said third terminal to apply an enabling signal thereto when said device is in its other stable condition, to thereby select the particular AND circuit for said terminal pair which is effective, together with said first terminal, to produce digital information at said single common output.

12. In an apparatus for converging analog information to digital information, in combination, means for simultaneously translating a series of analog signals to corresponding coded signals representative of digital information, a first terminal for sensing a first of said coded signals representative of a least significant digit, a terminal pair including a second terminal and a third terminal for sensing a second of said coded signals representative of a next least significant digit, a single output common to all of said terminals for producing serialized digital information representative of said least and then said next least significant digits, a plurality of AND circuits, each of said AND circuits having a pair of inputs and an output, one of said AND circuits being provided for each of said terminals, one of the inputs of each of said AND circuits being directly connected to the corresponding terminal and the outputs of all of said AND circuits being directly connected to said single common output, means for applying an enabling signal to the other input of the AND circuit for said first terminal, to thereby enable the transmission of a digital signal representative of said least significant digit to said single common output, a bistable electronic device, and return means directly connected between said single common output and the input of said bistable device for controlling the same, said bistable device having first output means directly connected to the other input of the AND circuit for said second terminal to apply an enabling signal thereto when said device is in one of its stable conditions and having second output means directly connected to the other input of the AND circuit for said third terminal for applying an enabling signal thereto when said device is in its other stable condition, to thereby select the particular AND circuit for said terminal pair which is effective to produce a digital signal representative of said next least significant digit at said single common output.

13. In an apparatus for converting analog information to digital information, in combination, means for simultaneously translating a series of analog signals to corresponding coded signals representative of digital information, a first terminal for sensing a first of said coded signals representative of a first digit, a terminal pair including a second terminal and a third terminal for sensing a second of said coded signals representative of a second digit, a single output common to all of said terminals for producing serialized digital information representative of said first and second digits, a plurality of AND circuits, each of said AND circuits having a pair of inputs and an output, a single one of said AND circuits being provided for each of said terminals, one of the inputs of each of said AND circuits being directly connected to the corresponding terminal and the outputs of all of said AND circuits being directly connected to said single common output, means for applying an enabling signal to the other input of the AND circuit for said first terminal, a bistable electronic device, and return means directly connected between said single common output and the input of said bistable device for controlling the same, said bistable device having first output means directly connected to the other input of the AND circuit for said second terminal to apply an enabling signal thereto when said device is in one of its stable conditions and having second output means directly connected to the other input of the AND circuit for said third terminal to apply an enabling signal thereto when said device is in its other stable condition, to thereby select the particular AND circuits for said terminal pair which is effective, together with said first terminal, to produce digital information at said single common output.

14. In an apparatus for converting analog information to digital information, said apparatus having a sensing terminal A for sensing a signal representative of a first coded digit and a sensing terminal pair including a terminal B and a terminal B′ for sensing a signal representative of a second coded digit, in combination, means including an OR circuit having a single output terminal common to all of said sensing terminals for producing serialized digital information representative of said analog information, a plurality of AND circuits, one of said AND circuits being provided for each of said sensing terminals, each of said AND circuits having a plurality of inputs and a single output directly connected to an input terminal of said OR circuit, one of the inputs of each said AND circuit being connected to the corresponding sensing terminal, means for applying an enabling signal to another input of the AND circuit for said sensing terminal A, a bistable electronic device having an input directly connected to the output terminal of said OR circuit and having first and second output terminals separate from said OR circuit output terminal, means for directly connecting the first output terminal of said bistable device to another input of the AND circuit for said sensing terminal B to apply an enabling signal thereto when said device is in one of its stable conditions, and means for directly connecting the second output terminal of said bistable device to another input of the AND circuit for said sensing terminal B′ for applying an enabling signal thereto when said device is in its other stable condition, to thereby produce coded digital information in serial form at said OR circuit output terminal representative of the information appearing at selected ones of said sensing terminals.

(References on following page)

References Cited in the file of this patent

UNITED STATES PATENTS

| | | |
|---|---|---|
| 2,731,631 | Spaulding | Jan. 17, 1956 |
| 2,747,797 | Beaumont | May 29, 1956 |
| 2,793,807 | Yaeger | May 28, 1957 |
| 2,866,184 | Grey | Dec. 23, 1958 |
| 2,880,410 | Postman | Mar. 31, 1959 |
| 2,977,582 | Wolman | Mar. 28, 1961 |
| 3,001,140 | Beck | Sept. 19, 1961 |
| 3,003,142 | Wolinsky | Oct. 3, 1961 |
| 3,030,617 | Chase | Apr. 17, 1962 |
| 3,056,956 | Retzinger | Oct. 2, 1962 |

OTHER REFERENCES

Publication "Librascope Analog-Digital Converter," Dec. 23, 1955 (6 pages).

Publication "Electronic Equipment," August 1955, (pages 12 and 13).